(No Model.) 2 Sheets—Sheet 1.

R. P. CURTIS.
PIPE THREADING MACHINE.

No. 443,501. Patented Dec. 30, 1890.

WITNESSES:

INVENTOR
Roderick P. Curtis
BY
ATTORNEY (No Model.) 2 Sheets—Sheet 2.

R. P. CURTIS.
PIPE THREADING MACHINE.

No. 443,501. Patented Dec. 30, 1890.

WITNESSES:

INVENTOR
Roderick P. Curtis
BY
F. W. Smith
ATTORNEY

UNITED STATES PATENT OFFICE.

RODERICK P. CURTIS, OF SOUTHPORT, ASSIGNOR TO CURTIS & CURTIS, OF BRIDGEPORT, CONNECTICUT.

PIPE-THREADING MACHINE.

SPECIFICATION forming part of Letters Patent No. 443,501, dated December 30, 1890.

Application filed March 28, 1890. Serial No. 345,699. (No model.)

*To all whom it may concern:*

Be it known that I, RODERICK P. CURTIS, a citizen of the United States, residing at Southport, in the county of Fairfield and State of Connecticut, have invented certain new and useful Improvements in Pipe-Threading Machines; and I do hereby declare the following to be a full, clear, and exact description of the invention, such as will enable others skilled in the art to which it appertains to make and use the same.

My invention has reference to pipe-threading machines, but more particularly refers to the means whereby the die-carrying ring may be forced inward, so that the dies may initially be brought into contact with the pipe to be threaded, and to the construction of the vise-jaws with the end in view to greatly strengthening them and to cheapen and simplify their mode of construction.

Figure 1:
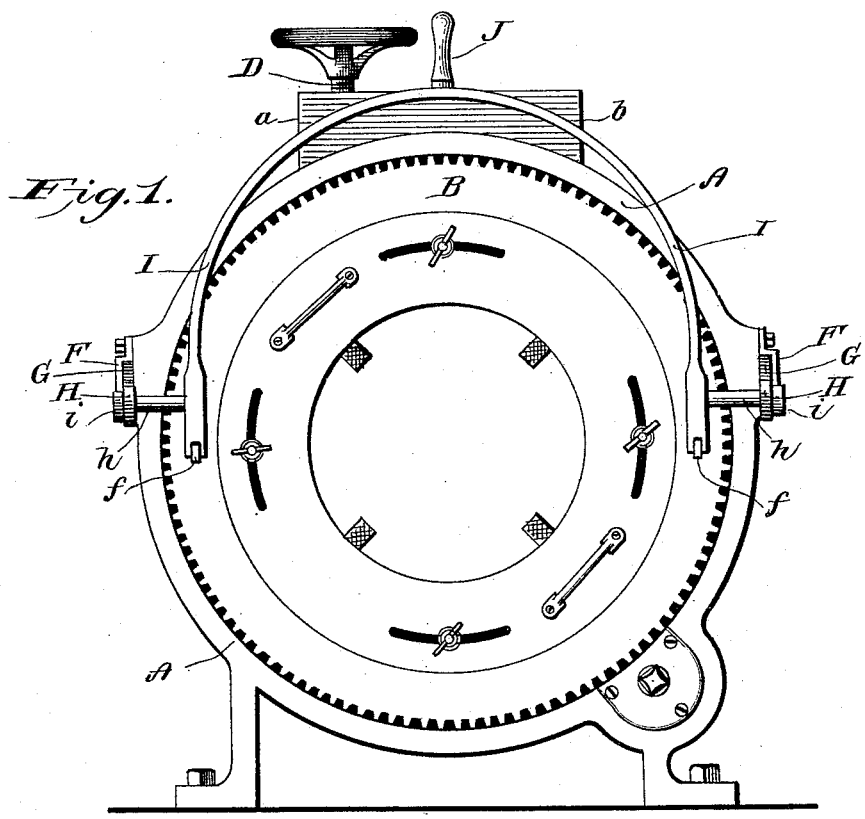
Figure 2:
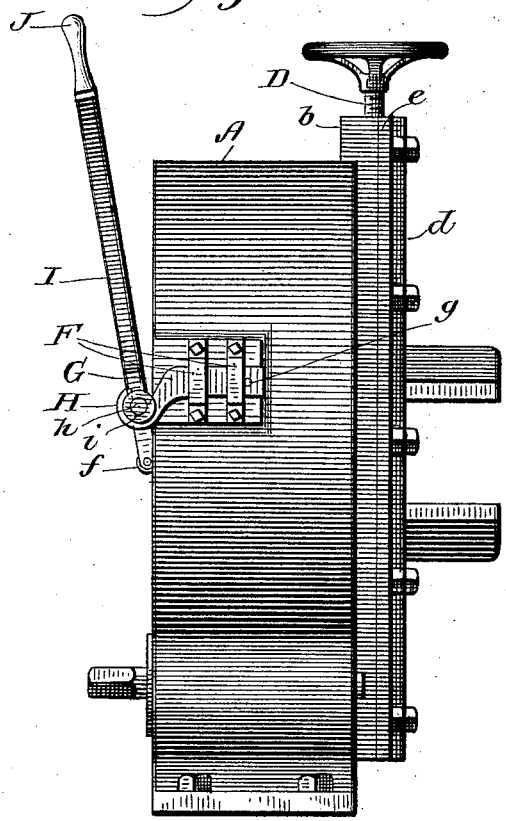
Figure 3:
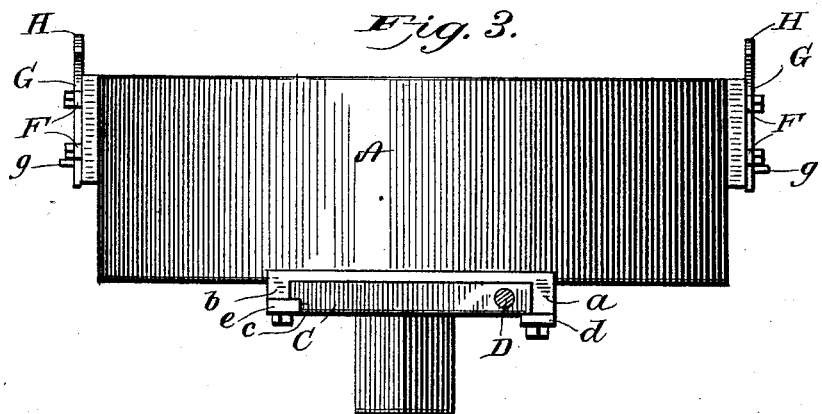

In the accompanying drawings, Figure 1 is a front elevation of a pipe-threading machine, showing particularly my improved device for operating the die-carrying ring toward the pipe; Fig. 2, a side elevation, and Fig. 3 a plan view, with the device for operating the die-carrying ring toward the pipe removed, the vise-screw being sectioned in order to show particularly my improved form of clamping-jaw and the manner of securing the same in position.

Similar letters denote like parts in the several figures of the drawings.

A is the casing, having an interior bearing for the die-carrying ring B, which latter has cogs on its periphery and is operated by a pinion, all precisely as shown and described in Letters Patent No. 253,996, issued to W. D. Forbes February 21, 1882. At the rear of the casing are cast the bearings *a b*, wherein the vise-jaws C slide, (only one of said jaws being shown.)

Heretofore in machines of this description a circular housing for the operating-screw has been cast with the jaws, as shown in Letters Patent issued to me July 2, 1889, No. 406,092; and while there is no objection to said housing as far as the operation of the jaws is concerned, still it is a matter of considerable extra expense to make this housing. In the present improvement I have therefore done away entirely with the circular housing for the operating-screw and provided a straight jaw with no circular "breaks," the bearing *a* being the full thickness of the jaws at the side through which the screw D passes, while the other side of the jaws is formed with a notch *c*. Straps *d e* are secured to the faces of the bearings *a b*, whereby the jaws are secured within the bearings, the strap *d* overlapping the face of the jaws, while the strap *e* fits within the notch *c*, thereby affording as wide a bearing for the jaws as is provided at the other side, while at the same time said jaws are considerably lightened by the cutting away of the notch. The pipe to be threaded is clamped by the jaws, and the die-carrying ring has a free movement within the casing, whereby the dies E may be brought into contact with said pipe. The means whereby I operate this ring is as follows: Secured to the opposite sides of the casing are brackets F, within which bars G are adapted to slide freely. These bars have pins *g* at their rear ends which abut against the rear brackets and thereby prevent the withdrawal of said bars. H are hooks formed at the front end of said bars and are projected in normal position beyond the front of the casing. I is a forked cam-lever having friction-rolls *f* journaled in the ends thereof and provided with axial pins *h*, which extend laterally from the sides of said lever. These pins rest within said hooks and are provided with heads *i*, to prevent lateral displacement. J is any convenient handle secured to or formed with said lever, and by means of which the latter is thrown forward to force said rolls *g* against the face of the die-carrying ring, whereby the latter is driven inward to carry the dies against the pipe, as will be readily understood. When not in use, the lever may be readily detached from the hooks and the latter thrown back out of the way.

Having thus fully described my invention, what I claim as new, and desire to secure by Letters Patent, is—

1. In a pipe-threading machine, the clamping-jaws rectangular in shape and having a bearing the full thickness of the jaws at one side and a notched bearing in the other side, in combination with rectangular ways in which said jaws slide, and the straps secured to the front edges of the ways and overlapping the jaws at one side and extending within the notched bearing at the other side, substantially as set forth.

2. In a pipe-threading machine, the combination, with the die-carrying ring adapted to slide within the casing, of the cam-lever detachably pivoted within bearings extended from the casing and adapted to be forced against the face of the ring, substantially as set forth.

3. The combination of the casing, the die-carrying ring adapted to slide therein, the brackets secured to the sides of said casing, the bars adapted to slide within said brackets and provided with pins which prevent the withdrawal of said bars, the open hooks formed at the front ends of said bars, and the forked cam-lever having friction-rolls in the operating ends thereof and provided with laterally-projecting axial pins journaled within said hooks and having heads, substantially as set forth.

In testimony whereof I affix my signature in presence of two witnesses.

RODERICK P. CURTIS.

Witnesses:
F. W. SMITH, Jr.,
J. P. FINCH.